Dec. 25, 1951 L. E. GODFRIAUX 2,579,566
TOOL FEED FOR LATHES
Filed Aug. 4, 1945 6 Sheets-Sheet 1

Louis E. Godfriaux
INVENTOR.
BY
ATTORNEY.

Dec. 25, 1951  L. E. GODFRIAUX  2,579,566
TOOL FEED FOR LATHES
Filed Aug. 4, 1945  6 Sheets-Sheet 2

FIG. 2.

Louis E. Godfriaux
INVENTOR.

BY
ATTORNEY.

Dec. 25, 1951 — L. E. GODFRIAUX — 2,579,566
TOOL FEED FOR LATHES
Filed Aug. 4, 1945 — 6 Sheets-Sheet 3

Louis E. Godfriaux
INVENTOR.
ATTORNEY.

Dec. 25, 1951     L. E. GODFRIAUX     2,579,566
TOOL FEED FOR LATHES
Filed Aug. 4, 1945     6 Sheets-Sheet 4

Louis E. Godfriaux
INVENTOR.

BY
ATTORNEY.

Dec. 25, 1951   L. E. GODFRIAUX   2,579,566
TOOL FEED FOR LATHES
Filed Aug. 4, 1945   6 Sheets-Sheet 6

Louis E. Godfriaux
INVENTOR.

BY
ATTORNEY.

Patented Dec. 25, 1951

2,579,566

UNITED STATES PATENT OFFICE 2,579,566

TOOL FEED FOR LATHES

Louis E. Godfriaux, Madison, Wis., assignor to Gisholt Machine Company, Madison, Wis., a corporation of Wisconsin Application August 4, 1945, Serial No. 608,985

8 Claims. (Cl. 82—21)

This invention relates to a tool feed for lathes and has reference to a feed and traverse mechanism for the transverse cutting tool of an automatic lathe.

The principal object of the invention is to provide a lathe having a servo-motor type of feed for the tool built into the lathe as the tool feed for all ranges of operation.

Another object is to provide a simple and infinitely variable tool feed for lathes without the use of expensive accessory equipment.

Another object is to provide a built-in control for the tool feed that will provide for contour duplication in an automatic lathe and at the same time be efficient for all types of operation of the lathe.

Another object is to provide a fluid pressure operated tool feed for lathes capable of feeding a cross slide or carriage or both in controlled cycles of traverse and feed movements with a single fluid power unit.

Another object is to provide a simple and accurate feed for a lathe tool in multiple whereby it may be fed in either direction longitudinally of the work and across the work to travel in any desired contour or path.

Another object is to provide a built-in servo-motor type of tool feed for lathes with a fluid power system capable of operating the tool under all conditions of traverse and feed movements required therefor.

Other objects of the invention are set forth in the description of embodiments of the invention illustrated in the accompanying drawings.

The turret lathe of Figs. 1 to 7, inclusive, is similar to that set forth in applicant's application, Serial No. 597,268, filed June 2, 1945, now Patent No. 2,565,305, granted Aug. 21, 1951, for Automatic Turret Lathe, and comprises a bed 1, a headstock 2 at one end of the bed, a tool post carriage 3 sliding longitudinally on the bed, and a turret carriage 4 also sliding longitudinally on the bed.

Figure 1:
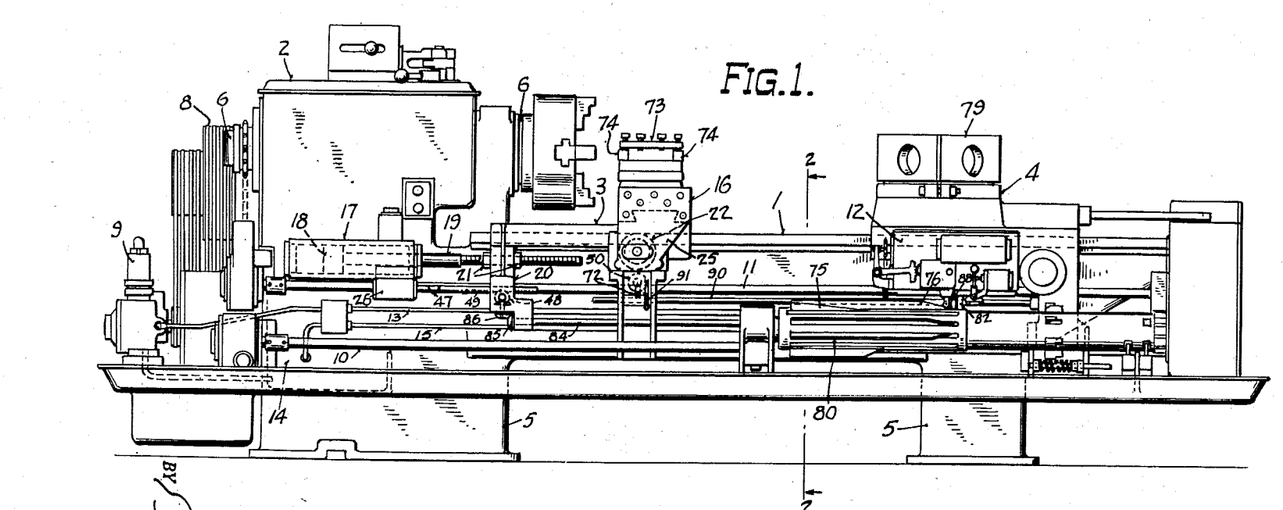
Figure 1 is a front elevation of a turret lathe showing a tool post carriage having a cross slide thereon.
Figure 2:
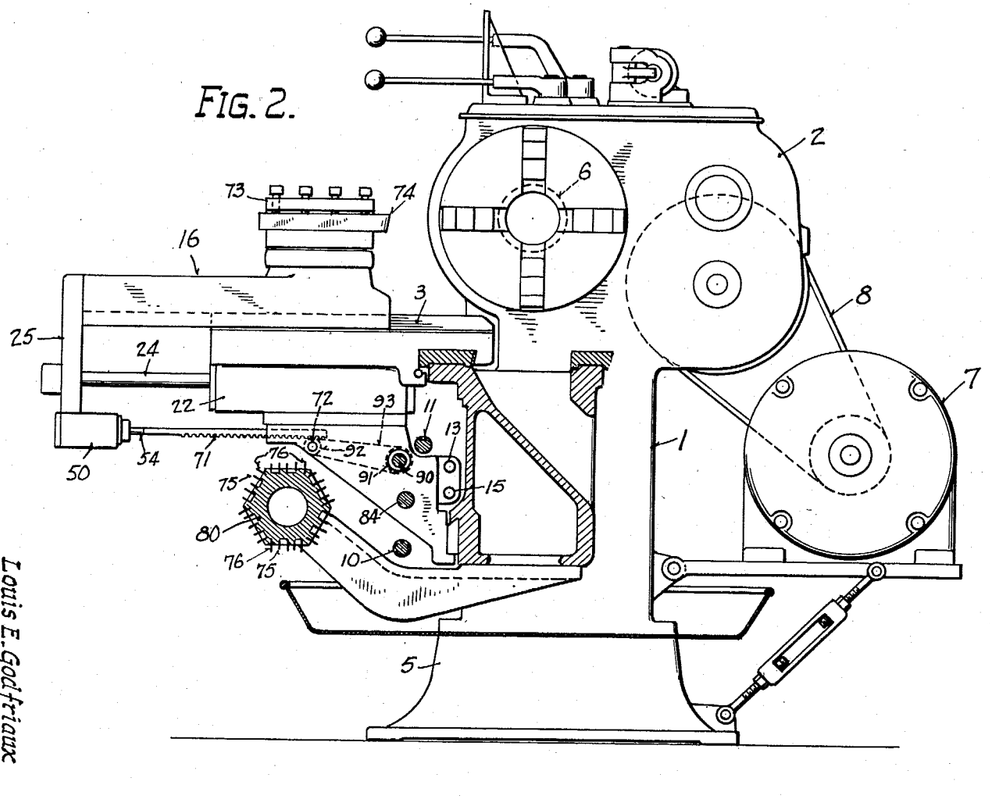
Fig. 2 is a transverse section of the lathe taken on line 2—2 of Fig. 1.

The bed 1 is supported on the floor or on a foundation by suitable legs 5, and a pan for coolant fluid and chips encircles the bed horizontally at a distance above the floor.

The headstock 2, disposed at one end of the bed, contains the power drive and shift mechanism for the lathe spindle 6 which rotates in bearings in the headstock housing and is disposed longitudinally of the lathe. A motor 7 drives the headstock by means of belt 8. The motor 7 also drives a variable displacement pump 9 which provides the fluid pressure for operating the servo-motors, hereinafter referred to.

The headstock 2 also drives the longitudinal traverse rod 10 for operating the turret carriage 4 in traverse. The feed rod 11 for operating the pump-motor unit 12 mounted on and feeding the turret carriage is driven by the spindle 6. The pump-motor unit is supplied with fluid under pressure from pump 9 by means of the telescopic tubes 13, the exhaust fluid returning from the pump-motor unit 12 to a sump 14 in the base of the main bed casting, by means of similar telescopic tubes 15. The pump 9 receives its supply of fluid from sump 14. The feed shaft 11 is rotated in correlation to and response to the rotation of spindle 6. The fluid pressure drive and the control of the turret carriage traverse and feed are more specifically described in applicant's co-pending application above referred to.

Figure 3:
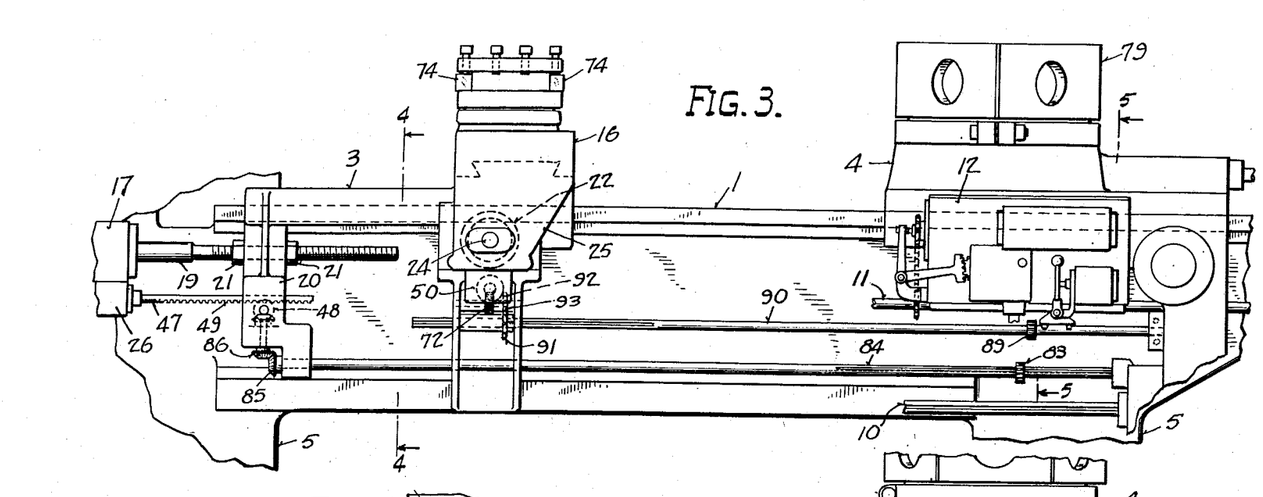
Fig. 3 is an enlarged front elevation of a part of the lathe showing the turret and tool post carriages with parts broken away.

The tool post carriage 3 and slide 16 thereon generally operate through a relatively short path of reciprocation and it is possible to drive them by means of fluid power cylinders. For this purpose the longitudinal drive cylinder 17 for the carriage 3 is secured on the front of the bed 1 and has a piston 18 therein with a piston rod 19 extending through the forward end of the cylinder and secured to a bracket arm 20 on the carriage 3 by nuts 21 adjustably threaded on the rod. Similarly a transverse power cylinder 22 secured on the carriage 3 and extending in the direction of movement of slide 16 has a piston 23 therein and a piston rod 24 extending through the forward end of the cylinder and secured at its outer end to a bracket arm 25 on the slide 16.

Figure 6:
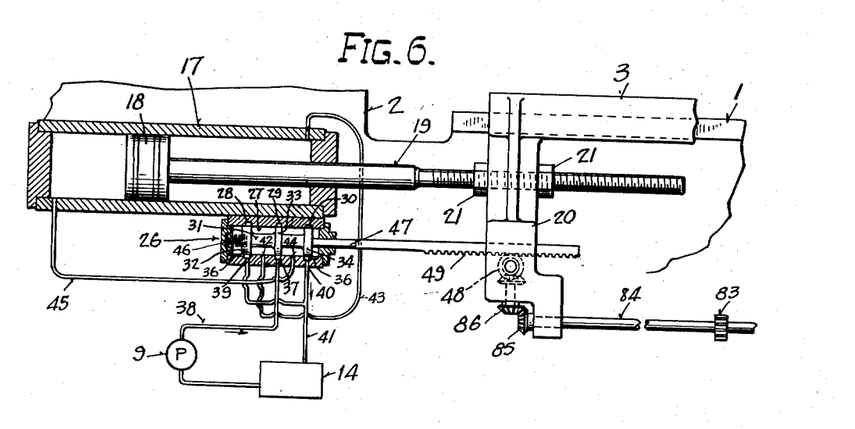
Fig. 6 is a longitudinal section showing the hydraulic power cylinder and follow-up valve constituting the servo-motor drive for the carriage.

The carriage drive cylinder 17 has its piston operated by a servo-motor valve 26 preferably carried by the cylinder and comprising a hollow-cylindrical valve body providing a valve chamber 27 which has three substantially equally spaced circumferential recesses 28, 29 and 30, and a valve plunger 31 having three flanges 32, 33 and 34, to provide a closure for the recesses when the flanges register therewith. The diameter of the flanges 32, 33 and 34 is such as to fit closely inside of chamber 27 and end flanges 32 and 34 are considerably wider than the corresponding recesses 28 and 30 in a direction toward the corresponding ends of the cylinder 17 to support the plunger in the cylinder. Central flange 33 is of approximately the same width as the central recess 29. The plunger may be moved to dispose the flanges toward either side of the corresponding recesses 28, 29 and 30.

The walls of the cylinder are longitudinally grooved at 36 between the end recesses 28 and 30 and the corresponding ends of chamber 27 in order to avoid building up of end pressure between the ends of plunger 31 and the ends of the valve body 26.

There are five ports leading to chamber 27 through the valve body 26. The central port 37 opens into the central recess 29 and supplies pressure fluid to chamber 27 through conduit 38 from pump 9. The left port 39 and right port 40 connect with recess 28 and recess 30, respectively, and serve to drain the opposite ends of chamber 27 through conduit 41 to sump 14 from which pump 9 takes its inlet.

A port 42 in the wall of valve body 26 between recesses 28 and 29 connects with the front end of power cylinder 17 through conduit 43. A similar port 44 in the wall of valve body 26 between recesses 29 and 30 connects with the rear or left end of power cylinder 17 through conduit 45.

The plunger 31 is biased outwardly of chamber 27 (to the right in the chamber) by a coil spring 46 disposed in the rear end of the chamber, and the position of the plunger is controlled by the rod 47 extending therefrom axially through the front end of the chamber 27 and valve body 26.

A gear 48 rotatably mounted in bracket arm 20 meshes with the rack on a control rod 49 which abuts the outer end of rod 47 and pushes the latter against the biasing force of spring 46.

Axial movement of rod 47 relative to valve 26 and arm 20 by rotation of gear 48 displaces the plunger 31 either to the right or left in valve chamber 27 thereby uncovering recesses 28, 29 and 30 and their corresponding ports 39, 37 and 40 which are normally closed by the corresponding flanges 32, 33 and 34 of the plunger. Uncovering of the ports, as described, effects the application of fluid pressure to a corresponding side of piston 18 in power cylinder 17 to move the carriage 3 in a direction tending to follow up the displacement of plunger 31 in chamber 27.

When the displacement of plunger 31 in chamber 27 is followed up by movement of arm 20 on carriage 3 to compensate for the initial lengthening or shortening of control rod 49 between the plunger and arm, flanges 32, 33 and 34 register with and cover the corresponding recesses 28, 29 and 30, thereby stopping the flow of fluid to and from power cylinder 17 and stopping further movement of carriage 3.

The servo-motor action may be illustrated by assuming that gear 48 is rotated to push control rod 49 and plunger 31 to the left or inwardly of valve 26 and chamber 27. As a result of this movement, the displacement of the plunger uncovers ports 39, 37 and 40 and provides for the passage of pressure fluid from pump 9, through conduit 38 central port 37, that part of chamber 27 confined between flanges 33 and 34, out port 44, through conduit 45 to the rear end of cylinder 17, thereby pushing piston 18 to the right and moving arm 20 and carriage 3 correspondingly to the right. Fluid is discharged from the right end of cylinder 17 through conduit 43, port 42, that part of chamber 27 confined between flanges 32 and 33, port 39, and conduit 41 to sump 14.

As piston 18 advances to the right, pushing arm 20, the latter carries control rod 49 to the right and thereby allows spring 46 to move plunger 31 back toward normal position where ports 39, 37 and 40 are closed and no further movement occurs.

The same servo-motor action, only in the reverse direction takes place when gear 48 is rotated to allow plunger 31 to move to the right in valve 26 under the influence of spring 46. In that instance pressure is admitted to the right-hand or forward end of cylinder 17 by passage from port 37 to port 42, and fluid is discharged from the left-hand or rear end of cylinder 17 through port 44 to port 40 and thence to sump 14.

Figures 7, 11:
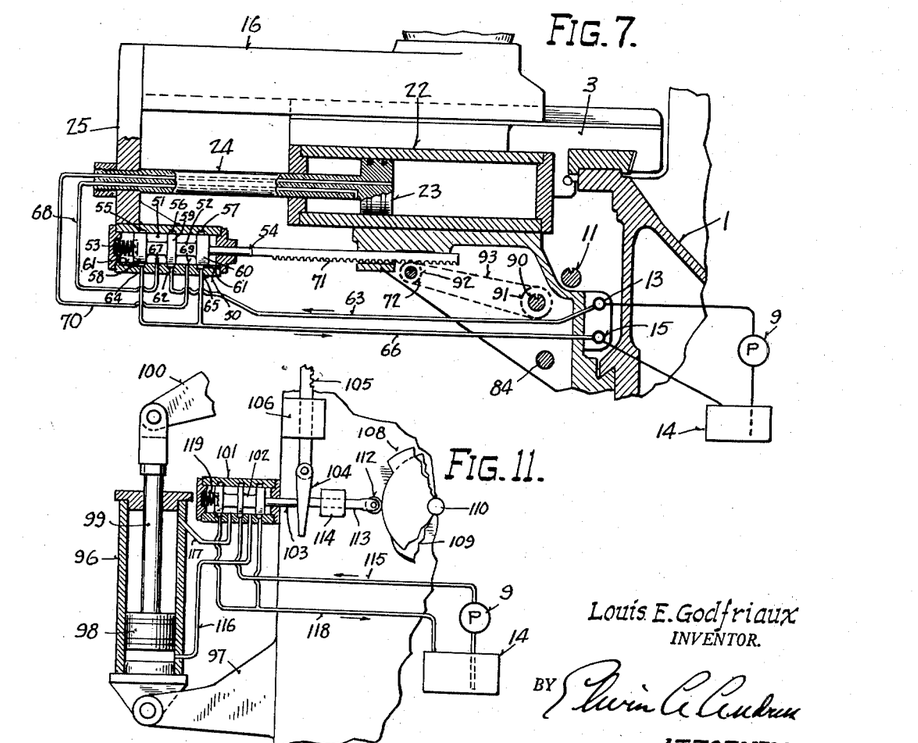
Fig. 7 is a transverse section showing the hydraulic power cylinder and follow-up valve constituting the servo-motor drive for the cross slide.
Fig. 11 is a detail section showing one of the hydraulic power cylinders and follow-up valves constituting the servo-motor drive for one of the tool posts for the lathe of Fig. 8.

The slide drive cylinder 22 has its piston 23 similarly operated by a servo-motor valve 50 mounted on bracket 25 on the slide. The valve 50 is constructed in the same manner as valve 26, previously described. However, since the valve is shown mounted on the member being moved (the slide) a detail description of its connections is given.

The valve 50 has a substantially cylindrical valve chamber 51 in which the plunger 52 reciprocates under the action of spring 53 in the outer end of chamber 51 and of a rod 54 secured to the plunger and extending axially through the inner end of the chamber 51 and valve body 50.

The walls of the chamber 51 contain the three spaced circumferential recesses 55, 56 and 57 which are normally covered and closed by the corresponding flanges 58, 59 and 60 on plunger 52. Longitudinal grooves 61 between the recesses 55 and 57 and the adjacent ends of chamber 51 relieve fluid pressure in the ends of the chamber that would otherwise oppose movement of the plunger 52.

The central recess 56 has a port 62 connected by flexible conduit 63 or a suitable telescopic connection to tube 13 to supply power fluid from pump 9. Recesses 55 and 57 have ports 64 and 65, respectively, connected by conduit 66 to tube 15 to drain fluid to sump 14.

Port 67 intermediate recesses 55 and 56 is connected by conduit 68 to the front end of power cylinder 22, and port 69 intermediate recesses 56 and 57 is connected by conduit 70 to the rear end of power cylinder 22.

The rod 54 extends inwardly of the carriage 3, and rack 71 meshing with a gear 72 rotatably mounted on the carriage pushes the rod against the biasing force of spring 53.

When gear 72 is rotated to move rack 71 outwardly relative to the carriage 3, the plunger 52 is moved against spring 53 to cause flanges 58, 59 and 60 to uncover their corresponding recesses 55, 56 and 57. As a result of this movement, power fluid is admitted from pump 9 through conduit 13, conduit 63, port 62, that part of chamber 51 confined between flanges 59 and 60, port 69, and conduit 70 to the rear end of power cylinder 22 where it pushes piston 23 and rod 24 outwardly carrying with it the bracket 25, slide 16 and valve body 50 until the servo-motor valve has reached its normal closed position. At the same time fluid is drained from the front end of power cylinder 22 through conduit 68, port 67, that part of chamber 51 confined between flanges 58 and 59, port 64, conduit 66, and conduit 15 to sump 14.

When gear 72 is rotated to allow rack 71 and the plunger 52 to be moved inwardly in the opposite direction by spring 53, the follow-up action of the valve 50 is similar. In this case power fluid is admitted from pump 9 through conduit 13, conduit 63, port 62, that part of chamber 51 confined between flanges 58 and 59, port 67, and conduit 68 to the front end of power cylinder 22. Fluid is drained from the rear end of cylinder 22 through conduit 70, port 69, that part of chamber 51 confined between flanges 59 and 60, port 65, conduit 66, and conduit 15 to the sump. The servo-motor or follow-up action of the construction in this instance effects an inward movement of the slide 16 and of valve body 50 until the normal closed position of the valve is reached.

If either or both of the plungers 31 and 52 are moved in either direction, either simultaneously or in timed sequence, at either a constant or varying rate, the tool post 73 with its tools 74 mounted on slide 16 can be made to travel in any desired path relative to the work which is chucked to spindle 6. Both traverse and feed movements may be provided for the slide 16 and carriage 3 by the same servo-motor construction.

The pump 9 is of a type which varies its displacement automatically with varying quantities of power fluid consumed to maintain a substantially constant working pressure in the system. When the carriage 3 and slide 16 are stationary and substantially no power fluid is being consumed, the pump 9 is reduced to its minimum displacement so as to avoid over-heating of the oil employed for power fluid. When power fluid is consumed the pump automatically steps up to a higher displacement capable of supplying the quantity required.

The control of the follow-up valves may be provided in several different ways.

In Figs. 1 to 7 the gears 48 and 72 are driven by means of cams 75 and 76, respectively disposed in front of the turret carriage 4 and the drive of the gears is co-related to the traverse and feed movements of carriage 4 by means of the cam followers 77 and 78 adapted to ride on the corresponding cams 75 and 76, as more specifically set forth in applicant's co-pending application referred to above.

Figures 4, 5:
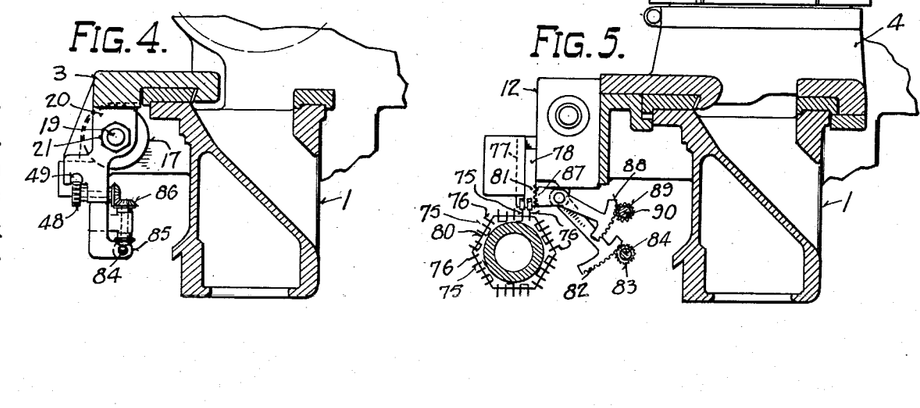
Fig. 4 is a transverse vertical section taken on line 4—4 of Fig. 3 and showing the construction for transmitting the carriage drive control.
Fig. 5 is a transverse vertical section taken on line 5—5 of Fig. 3 and showing the cam drum control for the servo-motors adapted to be operated by the movement of the turret carriage.

In this construction there are six sets of cams 75 and 76, each corresponding to the operations represented by a different face of the turret 79 on carriage 4. The different sets of cams are mounted on different faces of a drum 80 which is indexed in correlation to the indexing of turret 79 to bring the desired set of cams 75 and 76 into operative position for each operative indexed position of the turret.

Various drive connections may be provided between cam followers 77 and 78 and their corresponding control gears 48 and 72. A simple drive connection for follower 77 and gear 48 comprises a rack portion on follower 77 on carriage 4, raised and lowered with follower 77 in response to the height of cam 75 as carriage 4 moves along the cam, and which rack in turn drives a pivotal gear segment 82 which has its long arm meshing with a gear 83 splined to shaft 84. The shaft 84 extends forwardly through a bearing in carriage 3 to a beveled gear 85 on arm 20 where it drives gear 48 through a suitable bevel gear train 86. Gear 85 and shaft 84 are carried with bracket 20 when carriage 3 moves in response to the action of piston 18, the shaft 84 moving axially of gear 83 as permitted by its splined connection therewith.

A simple drive connection for follower 78 and gear 72 comprises a rack 81 on follower 78 raised and lowered with the follower in response to the height of cam 76 as carriage 4 moves along the cam, and which in turn drives a pivotal gear segment 87 which has its long arm 88 meshing with a gear 89 on shaft 90. The shaft 90 extends forwardly through carriage 3 where it carries a sprocket 91 splined thereto and which in turn drives a sprocket 92 on the shaft of gear 72 by means of the chain 93.

In the construction of Figs. 8 to 11, inclusive, the invention is shown as applied to an automatic lathe of a different type in which there is no tool post carriage or slide and in which two separate tools are fed toward the work from opposite sides thereof.

Figure 8:
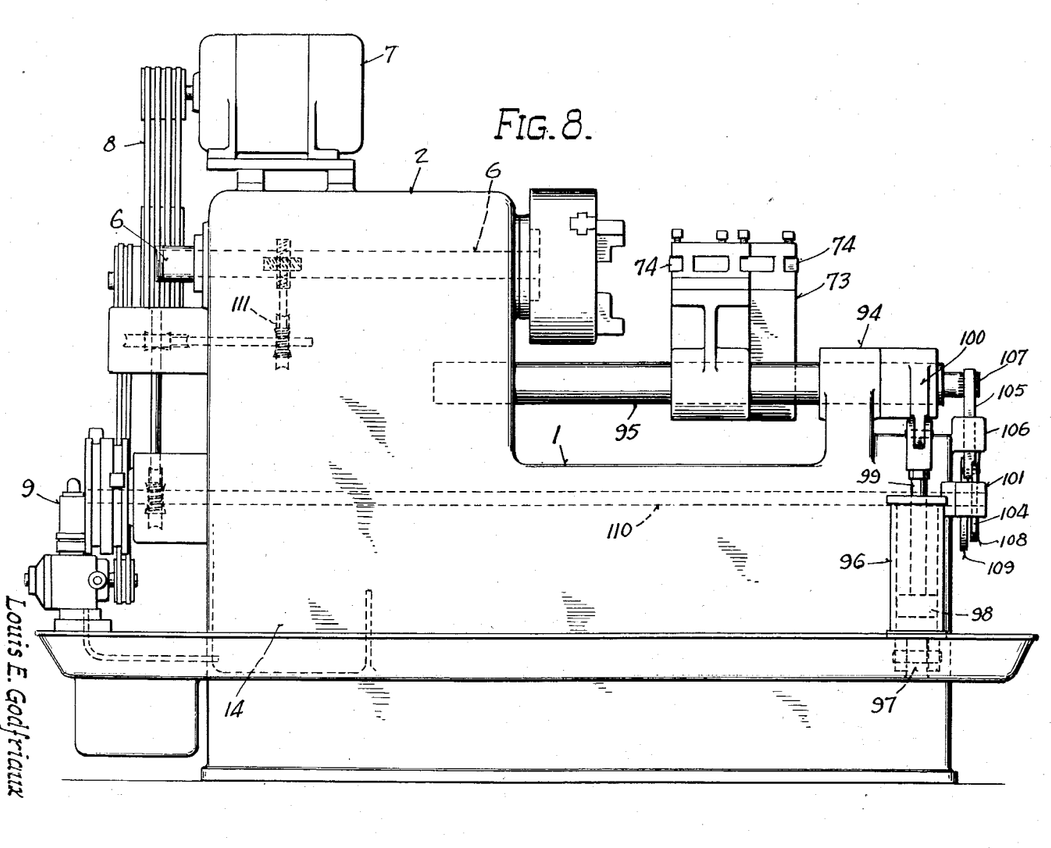
Fig. 8 is a front elevation of a modified form of lathe employing a cam drum in the bed and which is driven directly from the head stock for controlling the servo-motor traverse and feed for the tool posts.
Figure 10:
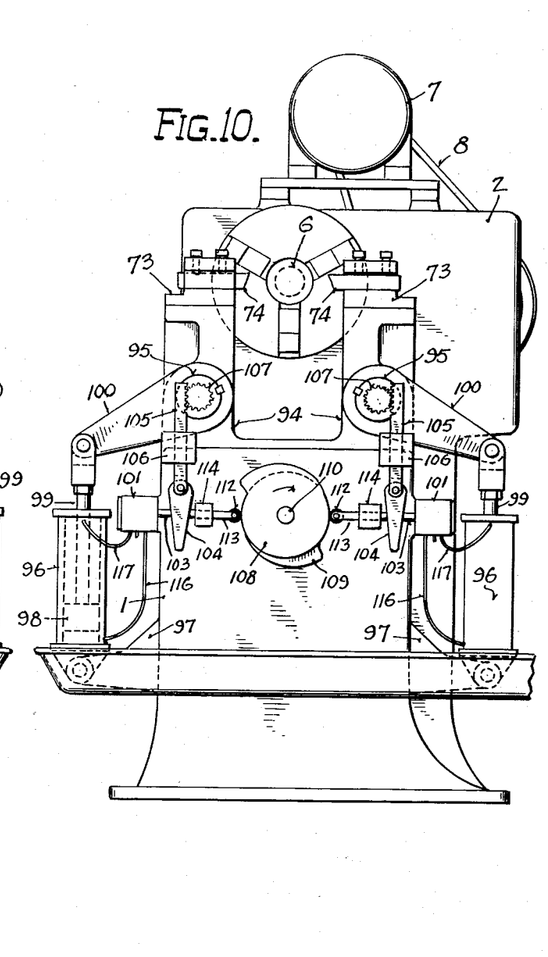
Fig. 10 is a right-hand end view of the lathe of Fig. 8 showing the servo-motor drives for the tool posts.

The bed 1 is shorter than in the previous construction and carries a pair of upstanding lugs 94 at its right-hand end and which provide rear bearings for a pair of longitudinal relatively large diameter shafts 95 that are journaled at their forward ends in the headstock 2 on opposite sides of the spindle 6.

Figure 9:
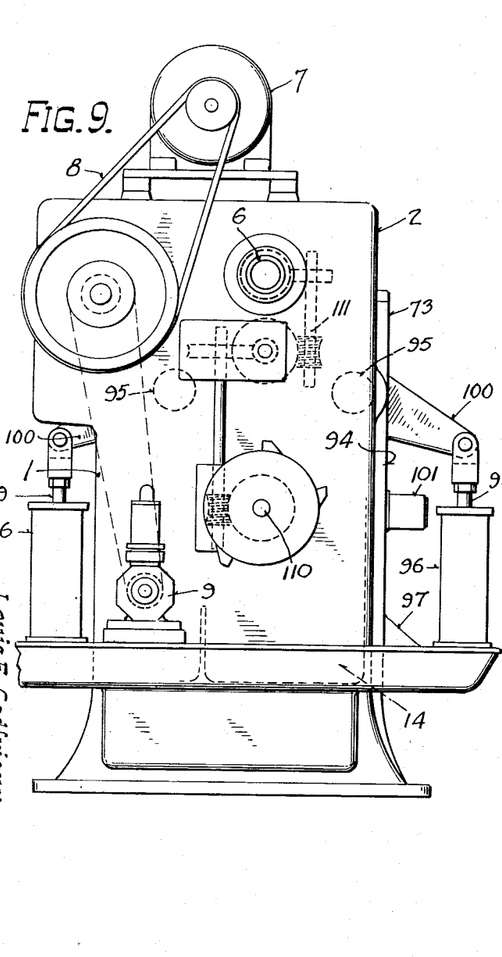
Fig. 9 is a left-hand end view of the lathe of Fig. 8 showing the head stock.

Each shaft 95 carries a tool post 73 with a cutting tool 74 thereon, the tool post 73 being adjustable in position longitudinally of the shaft and being secured thereto to pivot toward and away from the work chucked to spindle 6 in response to rotary movement of the corresponding shaft 95.

The rotary position of each shaft 95 is determined by a vertical power cylinder 96 pivotally mounted at its lower end on a lateral bracket 97 on the side of bed 1. The piston 98 of each cylinder is pivotally connected by the piston rod 99 to a lever arm 100 secured to the rear end of the corresponding shaft 95.

The operation of each power cylinder 96 is effected by a separate follow-up valve 101 secured on the rear end of bed 1 and having a construction similar to that of valves 26 and 50. The plunger 102 of valve 101 has its control rod 103 extending inwardly into abutting engagement with a wedge member 104 pivotally depending from a vertically movable rack 105. The rack 105 is held for vertical reciprocation in a block 106 on bed 1 and it meshes with gear teeth 107 on the rear end of the corresponding shaft 95 so that rotation of the shaft effects raising and lowering of the rack.

A pair of rotary cam wheels or drums 108 and 109 are mounted on the rear end of a shaft 110 extending longitudinally through the center of bed 1 and which is driven by a suitable gear train 111 in headstock 2 from the spindle 6 so that the rotation of cams 108 and 109 is in correlation to and response to the rotation of the spindle.

Cam 108 is designed to control the in and out movement of tool 74 on the front side of the lathe by controlling the in and out movement of control rod 103 for valve 101 on that side of the lathe. Similarly, cam 109 is designed to control the in and out movement of tool 74 on the rear side of the lathe by controlling the in and out movement of control rod 103 for valve 101 on that side of the lathe.

For this purpose each cam 108 and 109 operates a cam follower 112 having a rod 113 reciprocably mounted in lug 114 on the rear end of bed 1. The rod 113 is in alignment with the corresponding control rod 103 and abuts the opposite side of the corresponding wedge member 104 which is disposed therebetween and which determines the space between the ends of the corresponding rods 103 and 113.

In operation, when either cam 108 or 109 in its rotation forces its corresponding rod 113 outwardly to push its control rod 103 in a manner moving plunger 102 outwardly of the corresponding valve 101, pressure fluid is admitted from pump 9 through conduit 115, valve 101, and conduit 116 to the lower end of the corresponding power cylinder 96, thereby raising piston 98 and slowly rotating the corresponding shaft 95 to feed its tool 74 toward the work. At the same time fluid is discharged from the upper end of cylinder 96 through conduit 117, valve 101, and conduit 118 to sump 14 from which pump 9 receives its supply of power fluid.

The upward movement of piston 98 in rotating its corresponding shaft 95 effects a raising of the rack 105 which raises wedge member 104 and allows control rod 103 to move inwardly under the influence of its spring a distance compensating for the outward movement previously effected by the cam.

When rod 103 has moved inwardly sufficiently for plunger 102 to reach its normal position where valve 101 is closed, all further movement of piston 98 is stopped.

A gradual rise in either cam 108 or 109 will in this way effect a gradual movement of the corresponding tool inwardly of the workpiece. Likewise, a lowering of either cam effects an outward movement of the corresponding tool away from the workpiece.

Where either cam follower 112 moves inwardly by a lowering of the cam, its rod 113 allows wedge member 104 to move inwardly under the biasing influence of spring 119 on plunger 102. This opens valve 101 to admit power fluid to the upper end of cylinder 96 and discharge fluid from the lower end so as to effect a corresponding lowering of the piston 98 and the desired outward movement of the tool 74. Lowering of piston 98 effects a corresponding lowering of rack 105 and its wedge member 104, the latter thereby separating rods 103 and 113 and pushing plunger 102 against its spring 119 until the plunger closes the valve 101 and stops movement of piston 98.

The invention, in its various embodiments, provides a simple hydraulic control for the traverse and feed of a tool or tools in a lathe, which is built into the lathe and which is adaptable for all types of operation of the lathe. The invention is applicable to various types of lathes, as illustrated.

The tool is fed by a follow-up wave or servomotor by which the rate of feed is constantly under control and may be varied as desired either by some external cam control or in correlation to some movement of another lathe part such as the turret carriage, the spindle or the like.

Where a two-direction or compound feed is provided for a tool it is possible to do contour turning and to produce any desired pattern of movement of the tool relative to the work, both in and out and longitudinally of the work. The invention couples the feed with other basic movements of the lathe such as the spindle speed or turret carriage feed so that the tool can be fed in correlation to such basic movements. The cams employed may, however, modify the feed to produce the desired feed or pattern of movement.

The invention may have various embodiments within the scope of the accompanying claims.

I claim:

1. In an automatic lathe, a spindle adapted to carry a rotating workpiece, a tool post mounted on a rock shaft adjacent said spindle to pivot toward and away from the workpiece, a power cylinder disposed to operate a crank arm on said shaft to rock the same and thereby feed the tool post to and from the work, a headstock for driving said spindle, a rotary cam driven by said headstock in correlation to the spindle speed, a follow-up valve having its plunger responsive to said cam to control the operation of said valve and thereby the operation of said power cylinder, and means responsive to the operation of said power cylinder and the movement of said tool post to modify the operation of said plunger by said cam to effect the movement of the tool post in correlation to the rotation of said cam and its shape.

2. In an automatic lathe, a headstock having a rotary spindle adapted to carry a workpiece, a plurality of tool posts each mounted on a separate rock shaft disposed around the spindle to pivot toward and away from the workpiece, a separate power cylinder for operating each rock shaft by means of a crank arm on the corresponding shaft to rock the same and thereby feed the tool post to and from the work, a rotary cam member driven by said headstock in correlation to the spindle speed, a separate follow-up valve for controlling each of said power cylinders and having its plunger responsive to said cam member, and means responsive to the operation of the individual power cylinders to modify the operation of the corresponding valve plunger for each in a manner limiting the operation of the power cylinders to movements corresponding to and determined by said cam.

3. In an automatic lathe of the class described having a bed, a rotatable work-holding spindle, a tool support on said bed and movable longitudinally and transversely of said work-holding spindle, at least one hydraulic motor and control valve therefor disposed to effect movement of said support in one of said directions, said valve having casing and plunger members with one of the same freely supported by the other for relative axial movement, cam means on said bed and operable in predetermined relation to the rotation of said spindle, a rack disposed to operate said freely supported valve member, and a pinion disposed to traverse said rack in response to said cam, said supporting valve member and pinion being independently mounted for relative movement with one of the same being carried with said tool support whereby movement of the support effected by the rotation of said cam actuated pinion serves to further control said support by follow-up valve action.

4. In an automatic lathe of the class described having a bed, a work-holding spindle, a carriage mounted on and movable with respect to said bed, a cross slide mounted on said carriage and movable with respect thereto and a fluid motor and control valve therefor carried by said slide and carriage and disposed to move said slide relative to said carriage, said valve having casing and plunger members with one of the same freely supported by the other for relative axial movement, a remote control for said valve comprising a rotatable shaft carried by said bed and extending parallel to the direction of travel of said carriage, said shaft being rotated in predetermined relation to the automatic cycle of the lathe, a pinion gear rotatably mounted on said carriage and disposed to be rotated by said shaft irrespective of the position and motion of said carriage, and a control rack operatively connected to said freely supported valve member and engaging said pinion gear whereby relative movement of said slide and carriage is responsive in predetermined relation to the rotation of said shaft, said supporting valve member and pinion being independently mounted for relative movement with one of the same being carried with said slide whereby movement of the slide effected by the rotation of said cam actuated pinion serves to further control the slide by follow-up valve action.

5. In an automatic lathe of the class described having a bed, a carriage mounted on and movable with respect to said bed, a fluid motor and control valve therefor carried by said bed and said carriage and disposed to move said carriage with respect thereto, a cross slide mounted on said carriage and movable with respect thereto, a second fluid motor disposed to move said slide with respect to said carriage, and a valve for said second motor disposed to control the movement of the slide relative to said carriage, each of said valves having casing and plunger members with one of the same freely supported by the other for relative axial movement, a remote control for said control valves comprising rotatable shafts carried by said bed and extending parallel to the direction of travel of said carriage, said shafts being rotated in predetermined relation to the automatic cycle of the lathe, and control racks connected to operate the corresponding freely supported valve members and each disposed to move in predetermined response to the rotation of the corresponding shaft independently of the movement of the other, and said corresponding valve casing and plunger members being independently mounted for relative movement with the freely supported of said members carried with its corresponding carriage or slide whereby movement of the carriage or slide effected by the rotation of the corresponding shaft serves to further control such movement by follow-up valve action.

6. In an automatic lathe of the class described having a bed, a work-holding spindle, a carriage mounted on and movable with respect to said bed, a fluid motor and control valve therefor carried by said carriage and said bed disposed to move said carriage with respect to said bed, a cross slide mounted on said carriage and movable with respect thereto, a second fluid motor disposed to move said slide with respect to said carriage, and a valve disposed to control the movement of said second motor to move said slide relative to said carriage, each of said valves having casing and plunger members with one of the same freely supported by the other for relative axial movement, a remote control for said control valves comprising rotatable shafts carried by said bed and extending parallel to the direction of travel of said carriage, said shafts being rotated in predetermined relation to the automatic cycle of the lathe, a separate pinion gear journally mounted on said carriage and rotationally responsive to the rotation of each respective shaft irrespective of the position and motion of said carriage, and a separate control rack operatively connected to each respective freely supported valve member and engaging the corresponding pinion gear whereby movement of said slide and carriage is responsive in predetermined relation to the rotation of said shafts, and said corresponding supporting valve members and pinions being independently mounted for relative movement with one of the same being carried with its corresponding carriage or slide whereby movement of the carriage or slide effected by the rotation of the corresponding shaft serves to further control such movement by follow-up valve action.

7. In an automatic lathe of the class described having a bed, a work-holding spindle, a tool support mounted on and movable with respect to said spindle, a fluid motor and control valve therefor carried by said bed and disposed to move said tool support with respect thereto and to said spindle, said valve having casing and plunger members with one of the same freely supported by the other for relative axial movement, a remote control for said valve comprising a rotatable shaft carried by said bed and extending parallel to the direction of travel of said tool support, cam means on said bed to drive said shaft in predetermined relation to the rotation of said spindle, a pinion carried by said tool support rotationally responsive to the rotation of said shaft irrespective of the motion and position of said tool support, and a control rack connected to said freely supported valve member and engaging said pinion, said supporting valve member and pinion being independently mounted for relative movement with one of the same being carried with said tool support whereby movement of the support effected by the rotation of said cam actuated shaft and pinion serves to further control said support by follow-up valve action.

8. In an automatic lathe, a movable tool support, a fluid motor disposed to effect movement of said support, a control valve for said motor, a first cam means operating in correlation to the automatic cycle of the lathe and connected to said valve to operate the same, and a second cam means operating in correlation to the movement of said support and interposed between said first cam means and said valve to modify the control of said motor by said first cam means and provide follow-up action for said valve.

LOUIS E. GODFRIAUX.

(References on following page)

REFERENCES CITED

The following references are of record in the file of this patent:

UNITED STATES PATENTS

| Number | Name | Date |
|---|---|---|
| 1,855,343 | Vickers | Apr. 26, 1932 |
| 1,883,166 | Vickers | Oct. 18, 1932 |
| 1,896,052 | Ferris | Jan. 31, 1933 |
| 1,936,447 | Burrell | Nov. 21, 1933 |
| 1,939,102 | Burrell | Dec. 12, 1933 |
| 2,036,293 | Menninger et al. | Apr. 7, 1936 |
| 2,047,181 | Ferris | July 14, 1936 |
| 2,116,376 | Anderson | May 3, 1938 |
| 2,289,957 | Godfriaux | July 14, 1942 |
| 2,308,417 | Fritzsch | Jan. 12, 1943 |
| 2,338,125 | May | Jan. 4, 1944 |
| 2,346,418 | Dodson | Apr. 11, 1944 |
| 2,375,831 | Turchan et al. | May 15, 1945 |
| 2,388,265 | Johnson | Nov. 6, 1945 |